March 16, 1937.  F. O. KING  2,074,297
OPTICAL ILLUSION EFFECTS OR THE LIKE

Filed Feb. 21, 1935

Inventor
Frank O. King
By:
A. Trevor Jones  Atty

Patented Mar. 16, 1937

2,074,297

UNITED STATES PATENT OFFICE 2,074,297

OPTICAL ILLUSION EFFECTS OR THE LIKE

Frank O. King, Kissimmee, Fla.

Application February 21, 1935, Serial No. 7,506

4 Claims. (Cl. 272—8)

The present invention relates to the production of optical or visual illusion effects or the like.

An important object of the present improvement is to produce, without the aid of a mirror for example, the realistic effect to the eye of the observer of an actual image or reflection of an object or figure, together with a simulation of that object or figure, or its counterpart or complement.

In my Patent No. 1,535,782 of April 28, 1925, I disclosed a novel scenic effect produced by the provision of a combined cut-out figure or object and its counterpart, such as its reflection in water, the object and its counterpart being in a single common plane. My present invention discloses, by the provision of different planes, respectively, for the figure or object and for the simulation of its counterpart, or visual effect, associated in a novel way with a sight opening still further unexpected and curious optical illusions.

Like my patent referred to, the present application may be advantageously used in connection with display advertising as in store windows, in forming settings for entertainment and instruction, or decorative purposes generally.

The invention lends itself readily to embodiment in the usual cardboard panels or sheets struck out of the flat for convenient storage or shipment and readily set up in minature proscenium form.

Other objects and advantages will be apparent from the following description taken together with the accompanying drawing in which—

Figure 1:
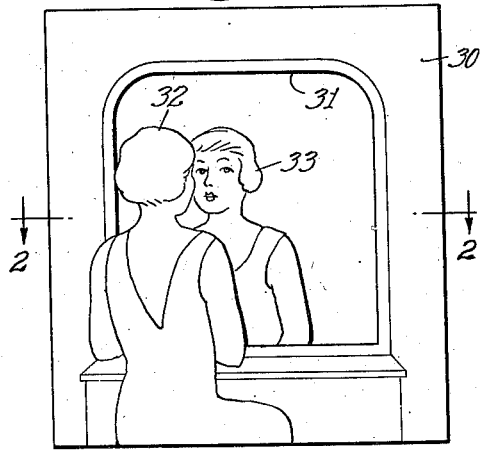
Figure 1 is a front view of a composite structure embodying my present invention.
Figure 2:
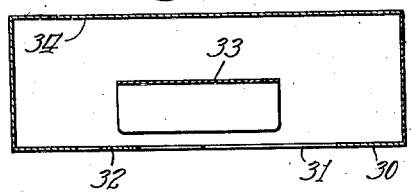
Figure 2 is a cross-section taken on the line 2—2 of Fig. 1.
Figure 3:
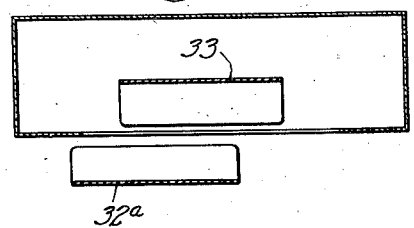
Figure 3 is a view similar to Fig. 2 but of a modified form.

As shown in Fig. 1, the panel 30 may have a sight opening 31 therein the margin of which simulates a frame of a mirror or the like. The foreground figure 32 may be cut out either integrally with the panel 30, as shown in Fig. 2, or may be a separate cut-out figure 32a as shown in Fig. 3. In either case, the figure 32 or 32a simulates, in this instance, the figure of a woman projected into the opening 31 when the panel 30 is viewed from the front as shown in Fig. 1.

Back of the panel 30 is another cut-out figure 33 disposed in a plane spaced slightly behind and parallel with the panel 30 and figure 32 or 32a as the case may be. As shown, the front surface of the figure 32, that is the one visible to the observer looking at the setting in its normal position as shown in Fig. 4, is made to represent the back of a woman seated before her mirror, and the front surface of the figure 33 is made to represent the face and bust of the same woman represented by the figure 32, the rear surface of which is unseen. In this instance by reason of the association of ideas to the observer, the margin of the sight opening 31 appears to be a surface substantially co-planar with the figure 33, such as the frame of a mirror, but being actually in different planes, a novel effect of a mirror and real image is produced. Thus the sight opening 31 itself appears to be a mirror in the plane of which the image 33 appears, and the margin of the sight opening 31 simulates a surface co-planar with the representation of an image or figure 33 rather than with the object 32. The figures are desirably somewhat staggered transversely of the opening 31 to produce the effect of slight rotation or perspective to the eye of the observer looking at the setting of Fig. 1.

A rear panel 34 may or may not be included in the setting of Figs. 1, 2 and 3, but in this instance is shown spaced still further rearwardly of the figure 33. The rear panel 34 may carry on its forward surface a simulation of a scene which, if the opening 31 were a real mirror, would be behind the observer. This is not necessary, however, to the illusion, and the rear panel 34 may be omitted or may be a blank surface.

While the figure 33 is desirably a cut-out it might be co-planar with a background 34, but I prefer the cut-out to enhance the optical illusion.

The panel 30 may be considered a foreground surface and the surface of 33 or 34 a background surface.

Various other modifications of my invention may occur to the user, all employing my essential novel idea here disclosed, and such adaptations may therefore be made as fall within the scope of the appended claims without departing from the invention.

Having described my invention, I claim:

1. Means for producing an optical illusion effect or the like comprising, in combination, a panel having a sight opening therein simulating the outline of a mirror, a forward figure associated with said opening, and a second figure comprising a cut-out disposed in a plane spaced rearwardly of the sight opening panel and parallel therewith, said second figure when viewed through the opening simulating a reflected image of the unseen rear surface of the first-mentioned figure.

2. Means for producing an optical illusion effect or the like comprising, in combination, a panel having a sight opening therein simulating the outline of a mirror, a forward figure associated with said opening, and a second figure comprising a cut-out disposed in a plane spaced rearwardly of the front panel and substantially parallel therewith, said second figure when viewed through the opening simulating a reflected image of the unseen rear surface of the first-mentioned figure, said second figure being slightly staggered with respect to the first figure transversely of the panel whereby both figures are visible from directly in front of the panel.

3. The structure of claim 1 wherein the said forward figure is also a cut-out figure and is spaced forwardly of the panel.

4. Means for producing an optical illusion effect comprising in combination a panel having a sight opening therein simulating the outline of a mirror or the like, a forward figure associated with said opening, a background surface spaced rearwardly of said sight opening panel, and a second figure associated with said background surface and when viewed through the opening simulating a reflected image of the unseen rear surface of the first mentioned figure.

FRANK O. KING.